US006253253B1

(12) United States Patent
Mason et al.

(10) Patent No.: US 6,253,253 B1
(45) Date of Patent: Jun. 26, 2001

(54) METHOD AND APPARATUS FOR OPTIMIZING REFERENCES TO OBJECTS IN A DATA PROCESSING SYSTEM

(75) Inventors: Carlton Keith Mason; Mohamad Kodeih, both of Austin; Robert Howard High, Jr., Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/917,992

(22) Filed: Aug. 25, 1997

(51) Int. Cl.$^7$ .................................................. G06F 9/54

(52) U.S. Cl. ................................................... 709/315

(58) Field of Search ................................ 395/680, 683, 395/684; 709/300, 303, 304, 103, 203, 228; 705/310–332

(56) References Cited

U.S. PATENT DOCUMENTS

| | | | | |
|---|---|---|---|---|
| 5,218,699 | * | 6/1993 | Brandle et al. | 395/650 |
| 5,481,721 | | 1/1996 | Serlet et al. | 709/315 |
| 5,488,723 | * | 1/1996 | Baradel et al. | 709/315 |
| 5,613,148 | | 3/1997 | Bezviner et al. | 709/203 |
| 5,619,710 | * | 4/1997 | Travis, Jr. et al. | 395/800 |
| 5,682,534 | * | 10/1997 | Kapoor et al. | 395/684 |
| 5,724,588 | * | 3/1998 | Hill et al. | 395/684 |
| 5,729,689 | * | 3/1998 | Allard et al. | 709/228 |
| 5,742,848 | * | 4/1998 | Burgess | 395/856 |
| 5,761,507 | * | 6/1998 | Govett | 395/684 |
| 5,793,965 | * | 8/1998 | Vanderbilt et al. | 709/203 |
| 5,832,219 | * | 11/1998 | Pettus | 395/200.33 |
| 5,873,092 | * | 2/1999 | Cheng et al. | 707/103 |
| 5,903,725 | * | 5/1999 | Colyer | 707/103 |

OTHER PUBLICATIONS

Somobjects Developer Toolkit Users Guide, Version 2.0, IBM, 4–14—4–20, 6–55—6–63, Jun. 1993.*
Thomas Ledoux, "Implementing proxy objects in a reflective ORB", ECOOP'97, Jun. 9–13, 1997.*
Y. Cai, "Design and Implementation of an extended CORBA naming service based on DCE CDS" (abstract ECOOP'97, Jun. 9–13, 1997.*
CORBAservices:Common object services services, Chapters 3 & 6, 1995.*
Orfali, Harkey, and Edwards, "The Essential Distributed Objects Survival Guide,"p.206, John Wiley & Sons, 1996.*
Naming Service Specification, Joint Object Services Submission, OMG TC Document 93.5.2, May 14, 1993.*
SOMobjects Developer's Toolkit Programmer's Guide, vol. I: SOM and DSOM, Version 3.0, 2nd ed., Dec. 1996.*
Microsoft Press Computer Dictionary, 3rd Edition, p.236, 1997.*
"The Common Object Request Broker: Architecture and Specification", Rev. 2.0, Jul. 1995, updated Jul. 1996 (36 pages).

* cited by examiner

Primary Examiner—St. John Courtenay, III
Assistant Examiner—Pat Caldwell
(74) Attorney, Agent, or Firm—David A. Mims, Jr.; Bracewell & Patterson, L.L.P.

(57) ABSTRACT

A method and apparatus for optimizing references to objects in a distributed data processing system. A method is invoked in a client process by client application on a target object. In response to determining that the target object is on a remote process reference, a smart proxy determines whether the message can be processed within the client process. In response to determining that the message can be processed in the client process, the message is processed locally. Otherwise the message is sent to the target object for processing.

5 Claims, 8 Drawing Sheets

METHOD AND APPARATUS FOR OPTIMIZING REFERENCES TO OBJECTS IN A DATA PROCESSING SYSTEM

BACKGROUND OF THE INVENTION

1. Technical Field

The present invention relates generally to an improved data processing system in particular to a method and apparatus for optimizing references to data structures. Still more particularly, the present invention relates to a method and apparatus for optimizing references to objects in a distributed object oriented environment.

2. Description of the Related Art

The development of application and system software for data processing systems has traditionally been a time consuming task. The field of software engineering has attempted to overcome the limitations of traditional techniques by proposing new, more efficient software development models. Object oriented programming has emerged as a promising technology that will allow rapid development, implementation and customization of objects. Each new object has certain data attributes and processes or methods that operate on that data. Data is said to be "encapsulated" by an object and can only be modified by the object methods invoked by sending a message to an object identifying the method and supplying any needed arguments.

Object oriented systems have two important properties in addition to encapsulation. "Inheritance" is the ability to derive a new object from an existing object and inherit all properties, including methods and data structure, from the existing object. The new object may have certain unique features which are supplied as overrides or modifications to the existing class. For example, a new subclass needs to specify only the functions and data that distinguish that class from the existing more general class.

The ability to override an existing method description enables polymorphism, the ability to have a single message to an object be processed in different ways depending on the object itself.

Inheritance and polymorphism create a powerful structure for implementing new software systems. The software developer does not have to develop each piece of a system, he or she need only specify the unique features of the system.

The power of object oriented systems is realized through the development of system "frameworks." A framework is a collection of base classes that can be used by a system implementor to create a final systems product. The framework is defined and developed to work together as a system. Conceptually, the framework is much like a set of standard hardware components used by computer hardware builders. Each of the components has certain defined functions and interfaces and the engineer assembles these components according to a particular design to create a unique hardware system.

The common object request broker architecture (CORBA) is a standard established by the object management group (OMG). This standard is based on an object oriented system in which an object system contains an allocation of objects that isolates the requestor's services (clients) from providers of services by well-defined encapsulating interface. In particular, clients are isolated from the implementation of service as data representations and executable code. More details on CORBA can be found in "The Common Object Request Broker: Architecture and Specification", Revision 2.0, July 1995, updated July 1996, which is available from OMG at OMG Headquarters, 492 Old Connecticut Path, Framingham, Mass. 01701.

Presently in CORBA, a client application accesses an object in a server data processing system through the object reference of the object. The object reference is manufactured and exported to clients by the server hosting the object. The object reference contains the information needed by the object request broker (ORB) to identify or locate the object within the server in a distributed data processing environment that is hosting the object. Client use of an object reference causes the object request broker to refer to the original object to the same server that manufactured the object reference. Additionally, OMG also has a naming service. The naming service is the principal mechanism in the CORBA environment to locate remote resources in a distributed object environment. The naming service allows clients to register human readable names with object references and have this association stored in a central repository. This service also allows clients to find or look up object references by the same human readable name. The naming context (NC) is the principal object within the name service that client programs interact with to register or look up resources.

OMG define interface for the naming service was designed to encapsulate existing naming or directory technology such as, for example, the distributed computing environment's (DCE) cell directory service (CDS). A distributed computing environment is an architecture consisting of standard programming interfaces, conventions and server functionalities (e.g. naming, distributed file system, remote procedure call) for distributing applications transparently across networks of heterogeneous computers. A cell directory service a component of DCE that provides the ability to assign a set of attributes to a name structured into a directory hierarchy. The CDS is used primarily within DCE to store remote procedure call (RPC) bindings, but its use is not limited to this.

In exploiting cell directory services, a problem of localization in object references occurs. Client use of an object reference, such as a naming context object reference, causes the object request broker to refer to the original object from the same server that manufactured the object reference, even if that server exists across a network in a distributed data processing system. This situation would occur even if the cell directory service clerk exists on the client machine or on another machine closer to the client machine capable of servicing the request. As a result, a potentially unnecessary and remote call is made across the network when it could have been serviced in a local fashion. Therefore, it would be advantageous for an improved method and apparatus for referencing objects in an object oriented environment in which objects are distributed across different machines in a distributed data processing system.

SUMMARY OF THE INVENTION

The present invention provides a method and apparatus for optimizing references to objects in an object oriented environment within a distributed data processing system. A method is invoked in a client process by client application on a target object. In response to determining that the target object is on a remote process reference, a smart proxy determines whether the message can be processed within the client process. In response to determining that the message can be processed in the client process, the message is processed locally. Otherwise the message is sent to the target object for processing.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
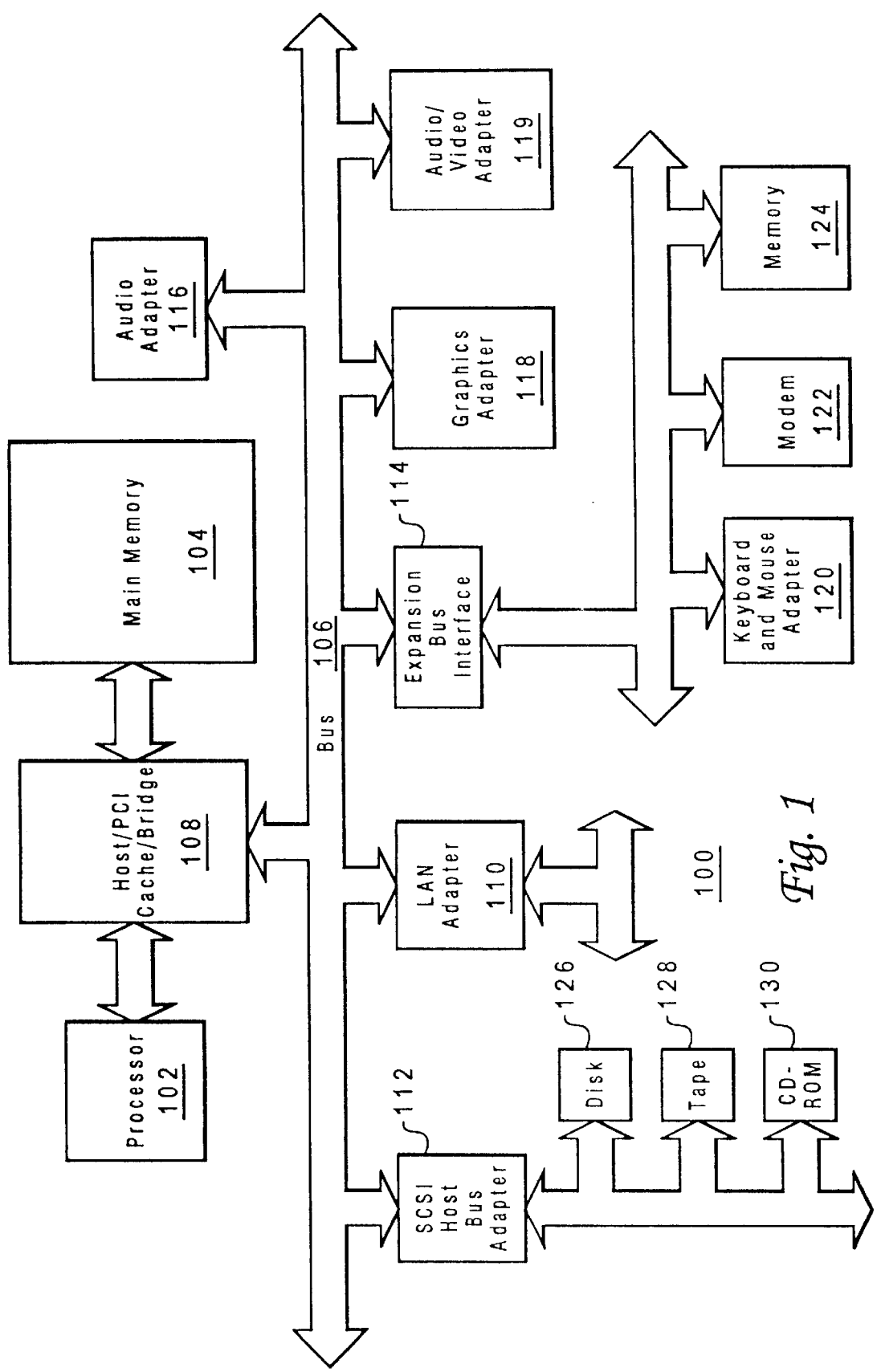
FIG. 1 is a block diagram of a data processing system in the present invention may be implemented.

With reference now to the figures, and in particular with reference to FIG. 1, a block diagram of a data processing system 100 in which the present invention may be implemented is illustrated. Data processing system 100 employs a peripheral component interconnect (PCI) local bus architecture. Although the depicted example employs a PCI bus, other bus architectures such as Micro Channel and ISA may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM 130 in the depicted example. Typical PCI local bus implementations will support three or four PCI expansion slots or add-in connectors. The depicted example includes four loads on the mother board and three expansion slots. Those of ordinary skill in the art will appreciate that the hardware in FIG. 1 may vary. For example, other peripheral devices, such as optical disk drives and the like may be used in addition to or in place of the hardware depicted in FIG. 1. The depicted example is not meant to imply architectural limitations with respect to the present invention.

Figure 2:
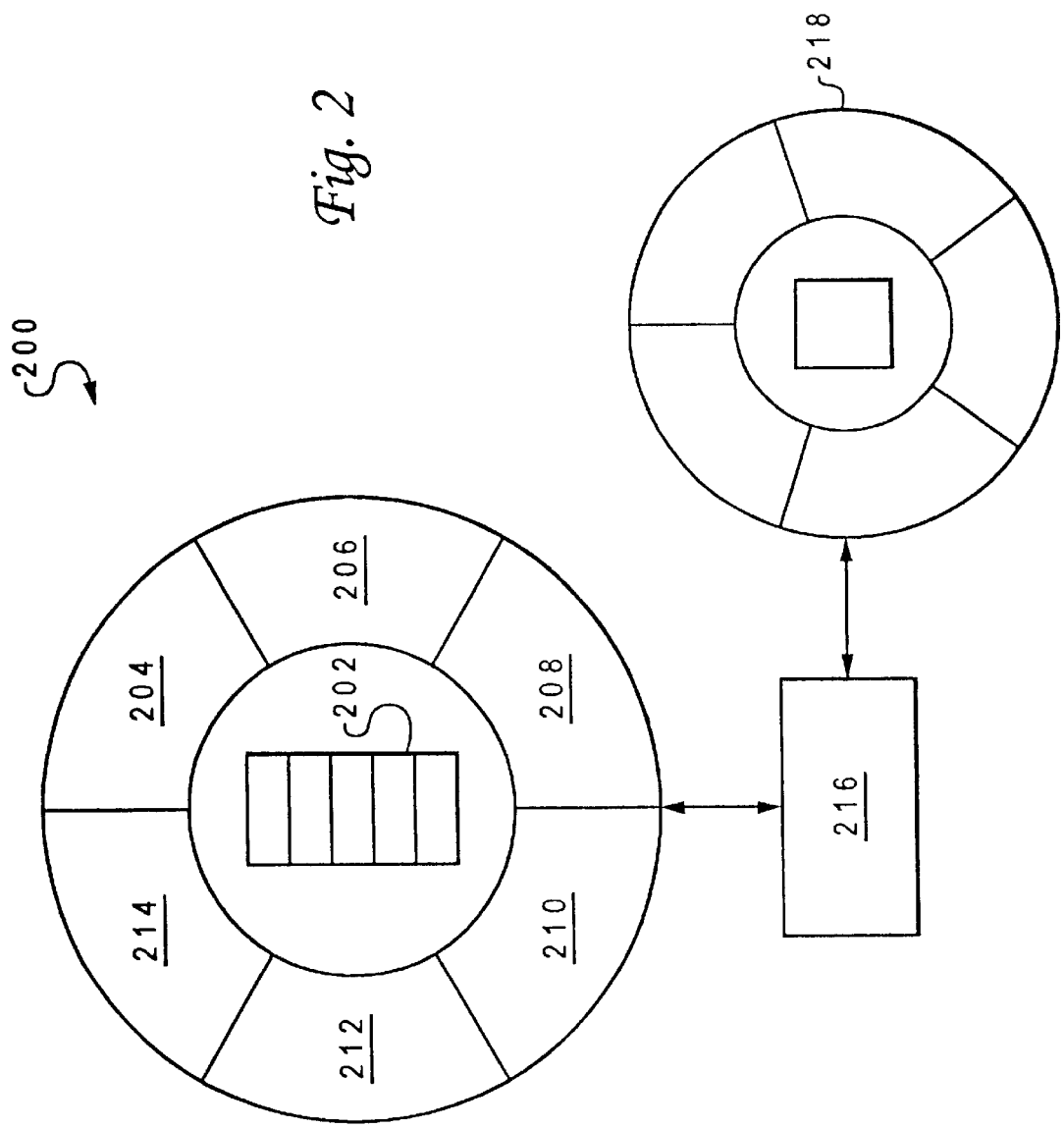
FIG. 2 is a diagram of objects in an object oriented system in accordance with a preferred embodiment of the present invention.

With reference to FIG. 2, a diagram of objects in an object oriented system is depicted in accordance with a preferred embodiment of the present invention. An object encapsulates data and the methods needed to operate on that data. Objects can be represented by a "doughnut diagram" such as shown in FIG. 2. Object data is shown in center 202 surrounded by the applicable methods 204 to 214. Data 202 may be modified only by the methods of that object. Methods 204–214 are invoked by receiving messages from other objects. A typical object oriented system will have a message router 216 that routes messages between objects. Thus, object 218 causes method 208, to be invoked by sending a message 218 to message router 216, which in turn sends the message to method 208 of object 200.

Object frameworks are constructed to provide a set of objects for application and system developers to use to construct a delivered system.

Objects are grouped into classes of related objects. The class description contains information relevant to all objects in a class, including a description of instance variables maintained by each of the objects and the available object methods. An object instance is created (or "instantiated") based on that information and has the properties defined in the object class. For example, the object class DOG can include the instance variables "dog_type" and "dog_name" and a "bark" method implementing the response to a bark message. An instance of dog, e.g. ROVER, will maintain the type and name instance variables for itself and will respond to the bark message.

Abstract classes are used to describe the interfaces and methods expected to be used by a class without providing detail on the implementation of those methods. Abstract classes are useful in frameworks where the implementation details are to be left to the implementor. Concrete classes are created as subclasses of abstract classes and implement those classes.

Figure 3:
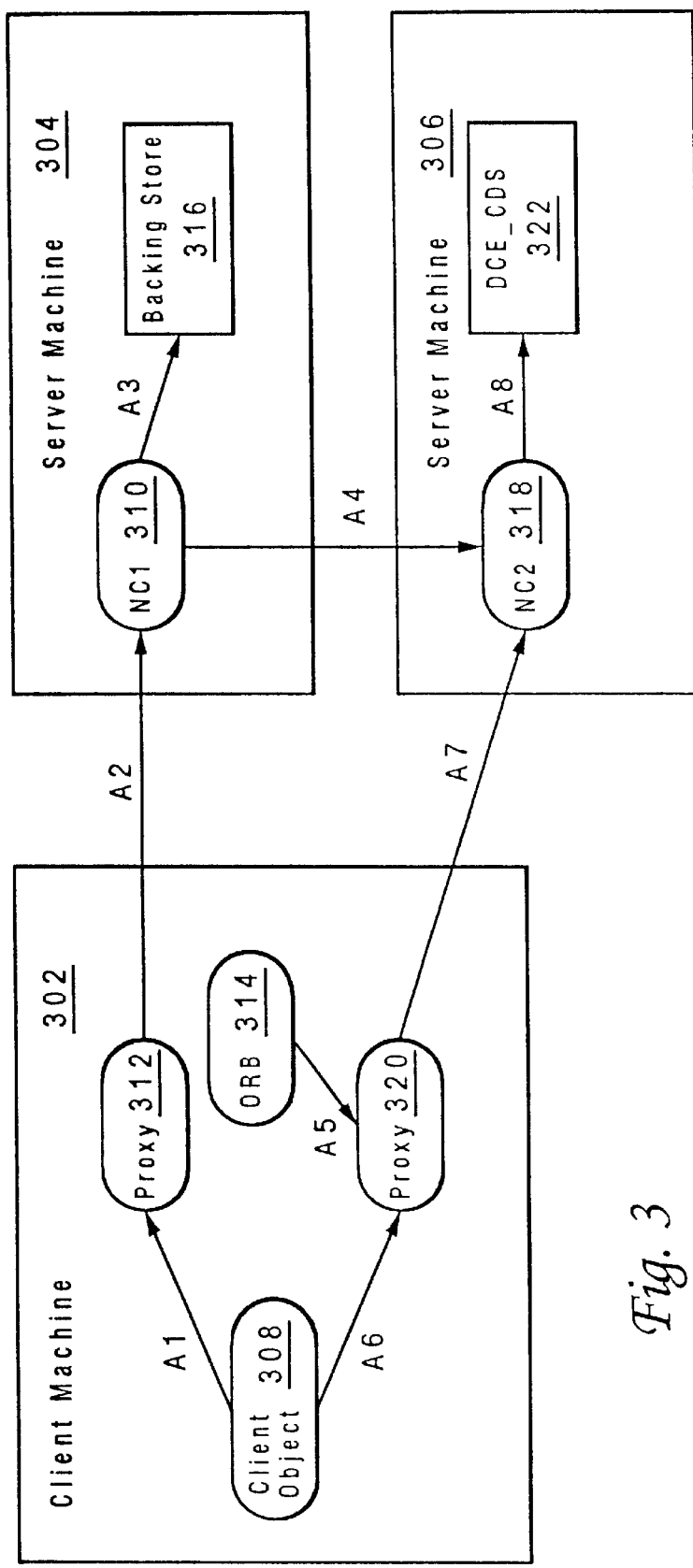
FIG. 3 is a block diagram illustrating a known process for invoking a method on a remote naming context.

With reference now to FIG. 3, a block diagram illustrating a known process for invoking a method on a remote naming context is illustrated. This block diagram illustrates a method invocation on a naming context using a regular (non-smart) proxy. In this depicted example, it is assumed that a naming context (NC1) is located on a backing store other than the DCE/CDS. A remote naming context (NC2) is implemented on a DCE/CDS. Additionally, a DCE/CDS naming context implementation and a DCE/CDS clerk are available to client machine 302.

Distributed data processing system 300 contains a client machine 302, server machine 304, and server machine 306. Distributed data processing system 300 includes an object oriented environment with objects distributed across client machine 302, server machine 304, and server machine 306. Client object 308 is located within client machine 302. Client object 308 in the depicted example invokes a resolve method on naming context (NC1) 310 (step A1). A naming context is a container of name bindings that associates a human readable name to an object reference. Naming contexts support the CosNaming::Naming Context interface. Since naming context (NC1) 310 is located on server machine 304, the resolve method is invoked on proxy 312, which is the proxy for naming context (NC1) 310. A "proxy" is a piece of code that represents a server object on the client side. A proxy runs in the same address space as the client and provides local/remote transparency by intercepting a local call for a server object, which proxies then marshall to a remote server. Proxy 312 directs the resolve method to naming context (NC1) 310 through object request broker (ORB) 314 (step A2). Naming context (NC1) 310 makes the appropriate backing store calls to backing store 316 to find the object whose name is supplied by the resolve method (step A3). A backing store is a persistent storage mechanism in the depicted example. In response to the name obtained by naming context (NC1) 310 pointing to naming context (NC2) 318, naming context (NC1) 310 invokes a remote resolve method on naming context (NC2) 318 (step A4). In this case, the name supplied with the resolve method resolves to naming context (NC2) 318 on another remote machine, server machine 306.

As a result of the call to resolve returning a reference to naming context (NC2) 318, object request broker 314 creates a proxy 320 to that object, naming context (NC2) 318 (step A5). Next, client object 308 invokes a bind method on proxy 320, which is a proxy of naming context (NC2) 318 (step A6). The bind method is directed through object request broker 314 to naming context (NC2) 318 (step A7). The bind method is a method on a naming context object. The bind operation takes as parameters a human readable name and an object reference. The bind operation associates the human readable name to the supplied object reference and adds the pair to the naming repository. A name associated with an object reference is called a name binding (e.g., a name is bound with an object reference). The naming repository is a collection of these name bindings. Client programs use the naming repository to lookup object references by name. The resolve method of the naming context object, such as naming context (NC2) 318 is used to lookup name bindings. In response, naming context (NC2) 318 makes the appropriate DCE/CDS calls to DCE/CDS 322 (step A8). The DCE Cell Directory Service (CDS) provides a secure, distributed, and replicated naming service. It provides a central place to locate resources in a distributed environment. Typically, RPC bindings are stored in CDS. However, many other types of resources may be stored in CDS. The CDS provides many programming interfaces to add, remove, find, and list the contents of the naming service. The implementation of a naming context object uses the programming interface of the DCE/CDS to implement its methods (i.e., bind, resolve, and the like).

Figure 4:
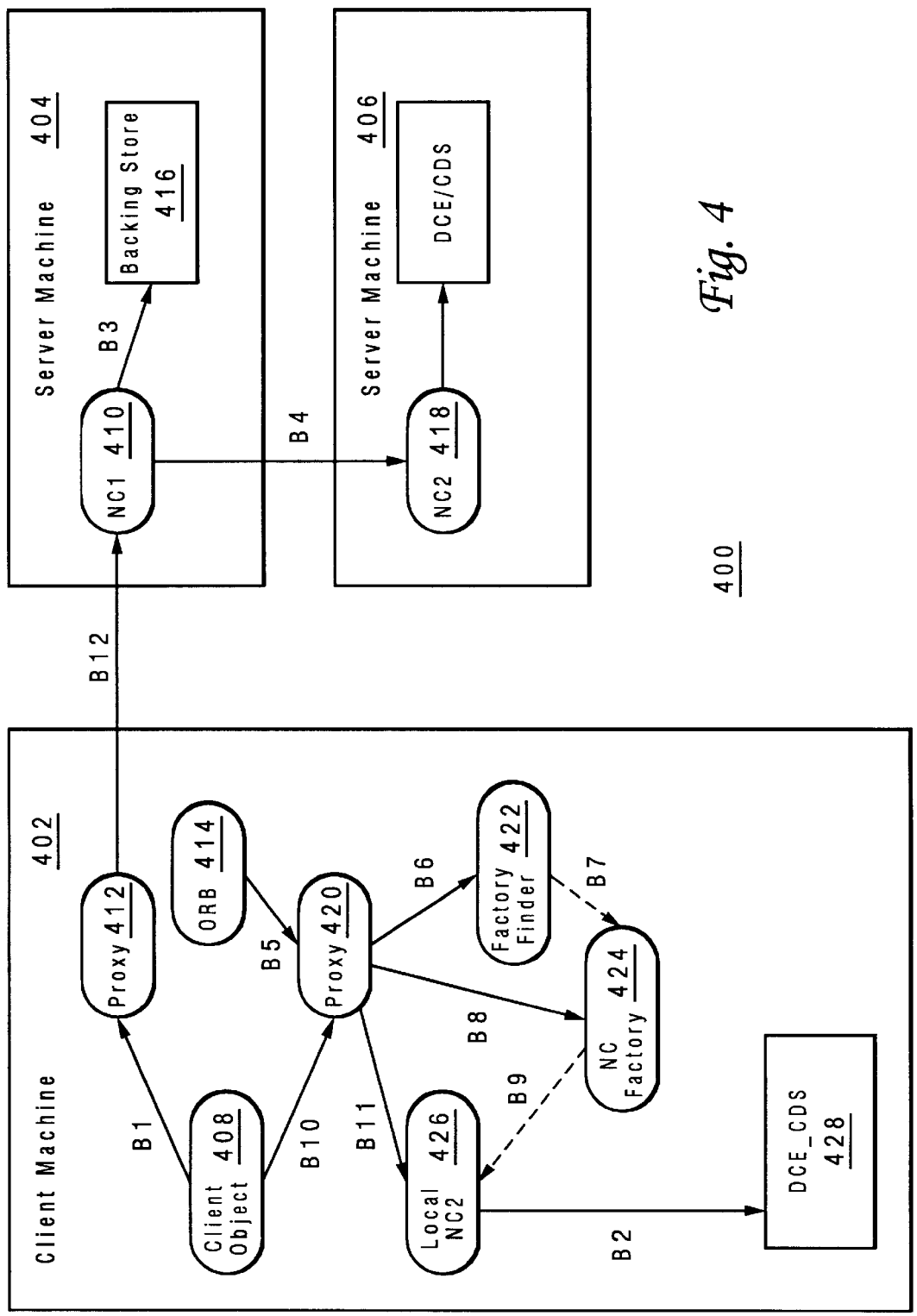
FIG. 4 is a block diagram of a process for invoking a method on a remote naming context in a distributed data processing system in accordance with a preferred embodiment of the present invention.

The present invention provides within the client process a smart proxy, which in addition to providing services of a non-smart proxy, that accepts messages and determines if it can service the message within the client process, using local operations, rather than with remote operations that require calls to be made to another process or server. A process is an executable piece of code that occupies an address space within a data processing system. A client process typically sends messages to, or request services from, a server process. A client process usually does not service requests from other processes. A server process is capable of providing a service or resource that a client is not providing. With reference now to FIG. 4, a block diagram of a process for invoking a method on a remote naming context in a distributed data processing system is in accordance with a preferred embodiment of the present invention. In this depicted example, it is assumed that a naming context (NC1) is located on a backing store other than the DCE/CDS. A remote naming context (NC2) is implemented on a DCE/CDS. Additionally, a DCE/CDS naming context implementation and a DCE/CDS clerk are available to client machine 402.

Distributed data processing system 400 includes a client machine 402, a server machine 404, and a server machine 406. These machines may be implemented using data processing systems such as, for example, data processing system 100 in FIG. 1. Client object 408 in client machine 402 invokes a resolve method on naming context (NC1) 410, which resides on a remote server, server machine 404. Since naming context (NC1) 410 is located on server machine 404, the resolve method is invoked on proxy 412, which is a proxy of naming context (NC1) 410 (step B1). Proxy 412 directs the resolve method to naming context (NC1) 410 through object request broker (ORB) 414 (step B2). In response to the resolve method, naming context (NC1) 410 makes the appropriate backing stored calls to backing store 416 (step B3). These calls are employed to find the object whose name is supplied by the resolve method invoked client object 408.

In the depicted example, the name supplied with the resolve method resolves to naming context (NC2) 418, which is located in another remote machine, server machine 406. In the depicted example, the resolve is a recursive operation in which naming context (NC1) 410 invokes a remote resolve method on naming context (NC2) 418 (step B4). The call to resolve returns to object request broker 414, a reference to naming context (NC2) 410. In response in receiving this reference to a remote object, naming context (NC2) 418, object request broker 414 creates a proxy 420, which is a proxy to naming context (NC2) 418 (step B5). This proxy 420 is a smart proxy, which invokes a find factory method on factory finder 422, which resides on client machine 402 (step B6). In response, factory finder 422 finds and returns a reference to a factory object, naming context factory object 424 (step B7). A factory object is an object that is capable of creating another object. A "factory object" will create and initialize an object.

In response to receiving the reference to naming context factory object 424, proxy 420 invokes a create method on naming context factory object 424 (step B8). In response to the indication to this method by proxy 420, naming context factory object 424 creates a local naming context (NC2) 426 (step B9). After creation of local naming context (NC2) 426, client object 408 invokes a bind method on the proxy of local naming context (NC2) 426, (step B10). In the depicted example, the proxy for local naming context (NC2) 426 the smart proxy, proxy 420. The method is directed through object request broker 414 to local naming context (NC2) 426 (step B11). In response, local naming object (NC2) 426 makes the appropriate DCE/CDS calls to DCE/CDS 428 to perform the bind operation (step B12).

In the example depicted in FIG. 4, the smart proxy initiates creation of an object, local naming context (NC2) 426 that is within the client server machine to process messages from client object 408. Although this example of reference relocalization is specific to naming contexts, the processing of messages locally may be performed for any remote object that has a more local representative available. The client application and the original object reference used are not modified in anyway nor are they aware that the request may be serviced more locally.

Figure 5:
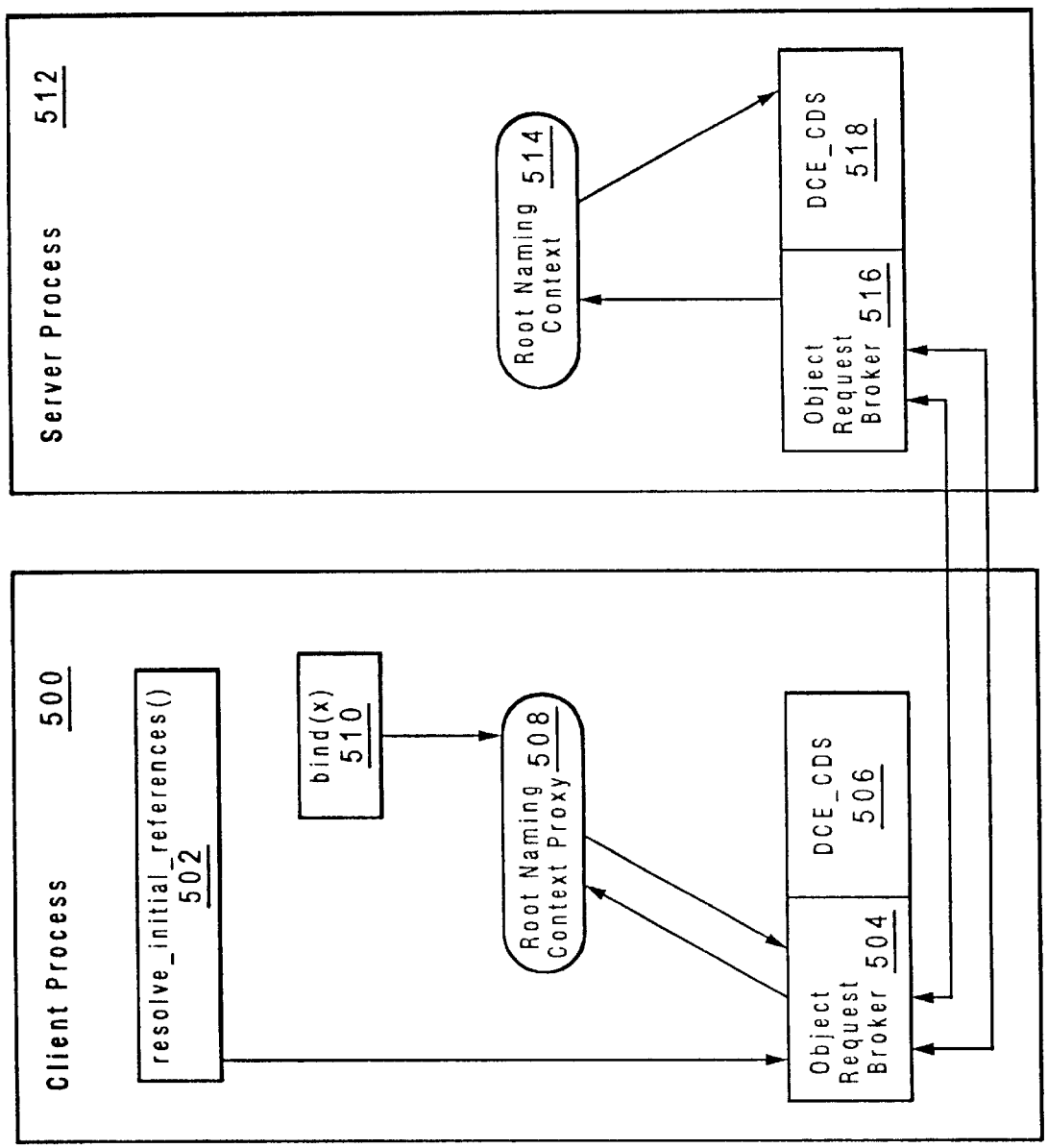
FIG. 5 is a diagram illustrating a known client process and a known server process.

With reference now to FIG. 5, a diagram illustrating a known client process and a known server process is illustrated. Client process 500 includes resolve_initial_references ( ) method 502 that may be invoked on object request broker 504. Client process 500 also includes DCE/CDS 506, root naming context proxy 508, and bind(x) method 510. Server process 512 includes root naming context 514, object request broker 516 and DCE/CDS 518.

Figure 6:
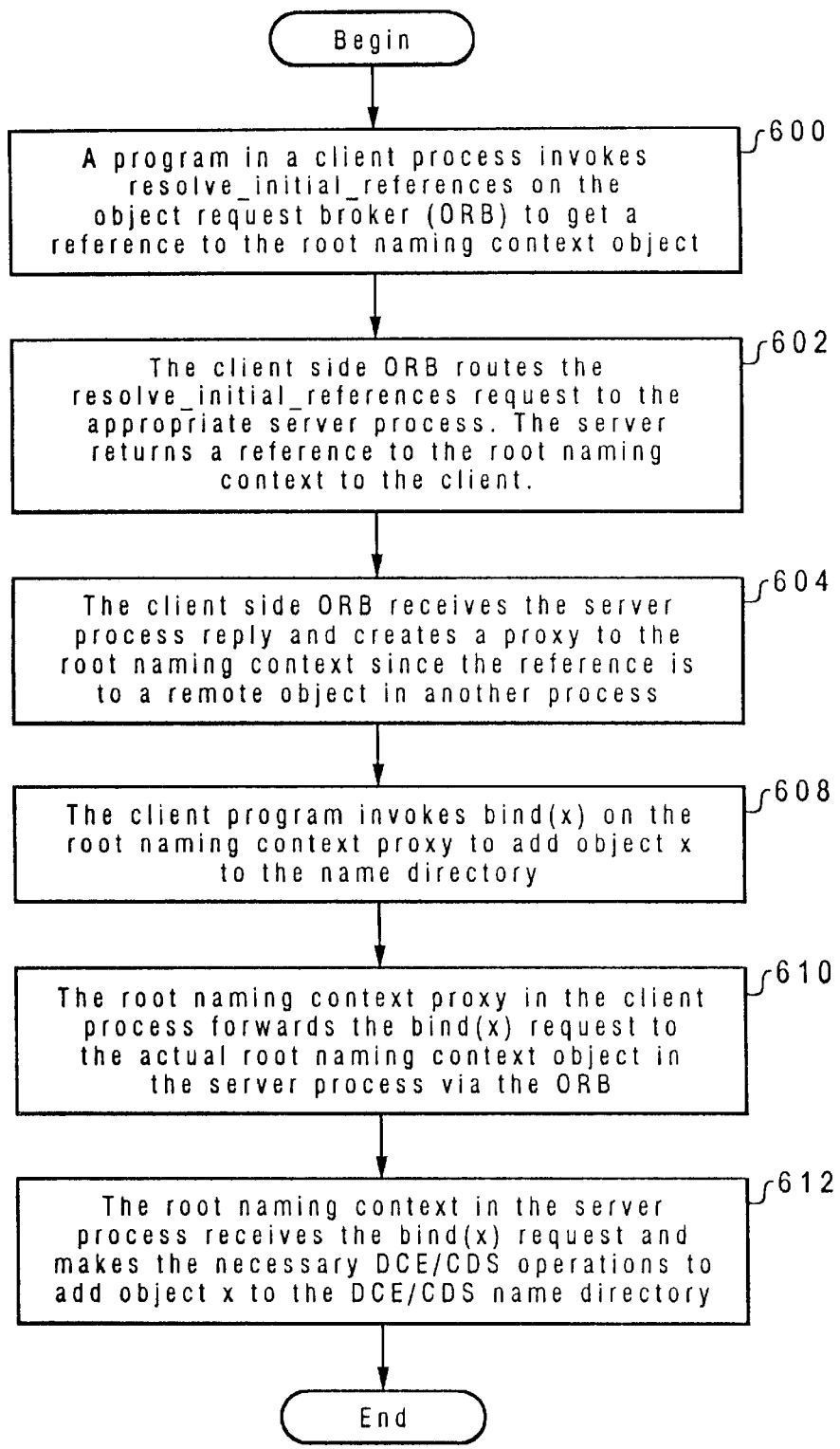
FIG. 6 is a flowchart of steps in a known client process and a known server process.

Turning now to FIG. 6, a flowchart of steps in a known client process and a known server process is depicted. The process begins by a program in client process 500 invoking resolve_initial_references on object request broker 504 to obtain a reference to root naming context object 514 (step 600). The client side object request broker, object broker 504, routes the resolve_initial_references to the appropriate server containing server process 512 with server process 514 returning a reference to the root naming context to client process 500 (step 602). Next, the client side object request broker receives the server process' reply and creates a proxy to the root naming context (root naming context proxy 508) because the reference is to a remote object in another process (step 604).

The program in client process 500 invokes a bind(x), bind(x) method 510 on root naming context proxy 508 to add object x to the name directory in DCE/CDS 518 (step 608). Thereafter, root naming context proxy 508 in client process 500 forwards the bind(x) request to the actual root naming context object in the server process via object request broker 504 (step 610). Thereafter, root naming context 514 receives the bind(x) request and makes the necessary DCE/CDS operations to add object x to the DCE/CDS name directory DCE/CDS 518 (step 612) with the process terminating thereafter.

Figure 7:
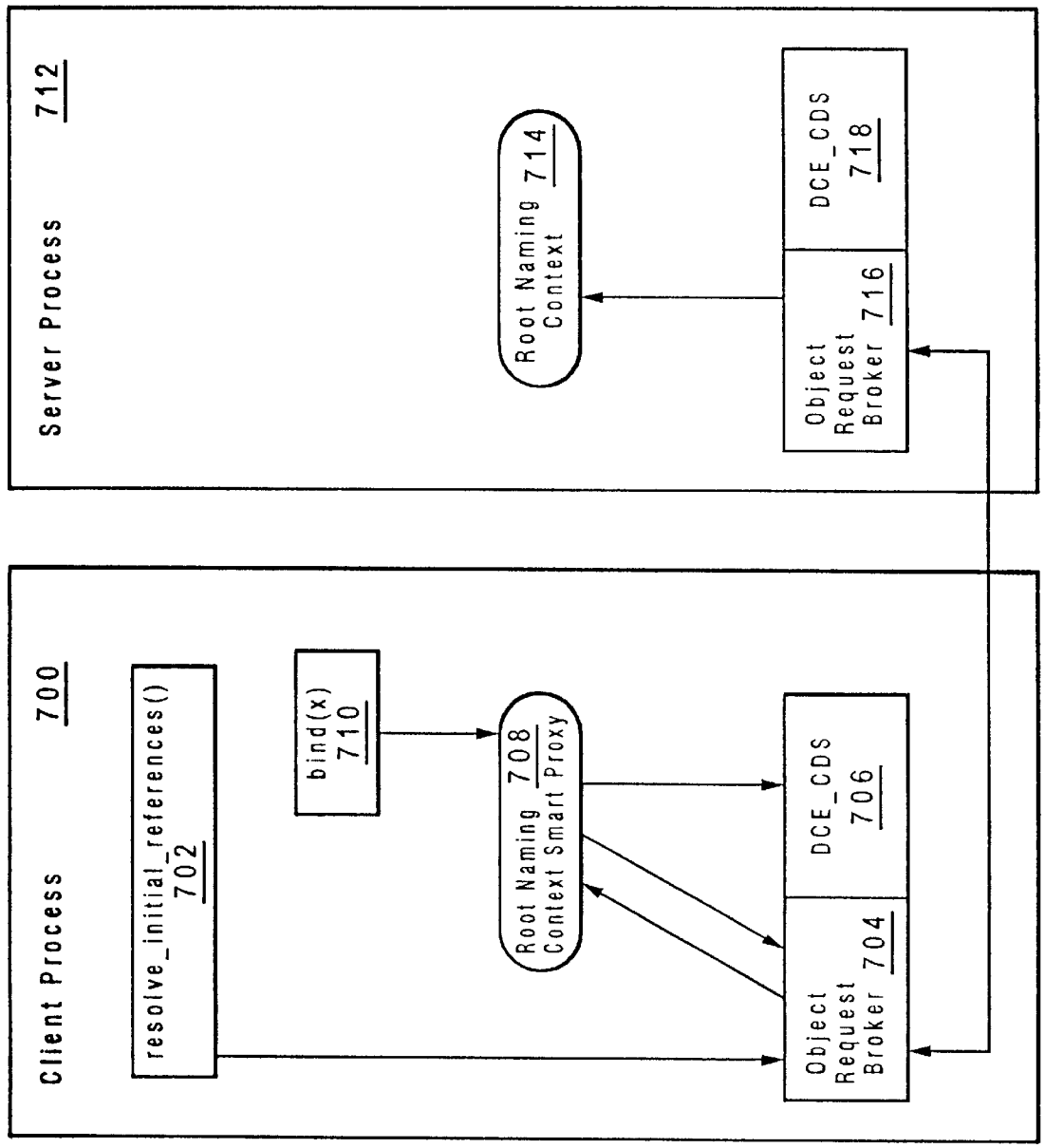
FIG. 7 is a block diagram of a client process and a server process in accordance with a preferred embodiment of the present invention.

Turning now to FIG. 7, a block diagram of a client process and a server process are illustrated in accordance with a preferred embodiment of the present invention. In the depicted example, the client process is located on a separate data processing system from the server process. Client process 700 includes resolve_initial_references ( ) method 702 that may be invoked on object request broker 704. Client process 700 also includes DCE/CDS 706, root naming context smart proxy 708, and bind(x) method 710. Root naming context smart proxy 708 is a smart proxy in contrast to root naming context proxy 508 from FIG. 5. Root naming context smart proxy 708 is able to determine whether a local DCE/CDS is present on the client system and make the necessary operations to add the object to the DCE/CDS name space in the client process rather than in the server process. Server process 712 includes root naming context 714, object request broker 716 and DCE/CDS 718.

Figure 8:
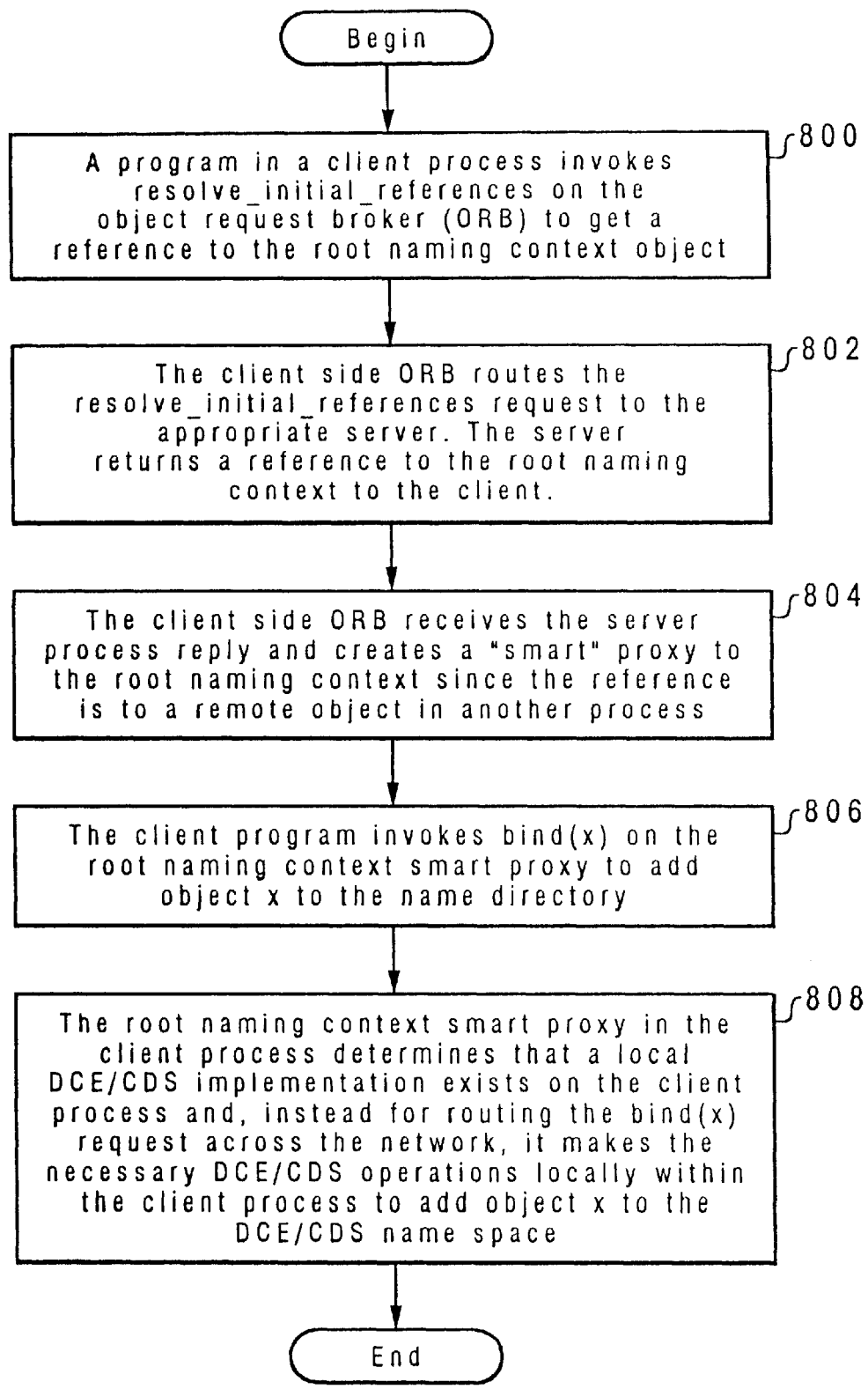
FIG. 8 is a flowchart illustrating steps employed in the client process and the server process in accordance with a preferred embodiment of the present invention.

Turning now to FIG. 8, a flowchart illustrating steps employed in the client process and the server process from FIG. 7 is depicted in accordance with a preferred embodiment of the present invention. The process begins by a program in client process 700 invoking resolve_initial references on object request broker 704 to obtain a reference to root naming context object 714 (step 800). The client side object request broker, object broker 704, routes the resolve_initial_references to the appropriate server containing server process 712 with server process 712 returning a reference to the root naming context to client process 700 (step 802).

In response to receiving the server process' reply, the client side object request broker, object request broker 704 creates a smart proxy to the root naming context, root naming context smart proxy 708, because the reference is to a remote object located within another process (step 804). The client program in client process 700 invokes bind(x) method 710 on root naming context smart proxy 708 to add object x to the name directory (step 806). Root naming context smart proxy 708 and client process 700 determines that a local DCE/CDS implementation, DCE/CDS 700, exists on client process 700 and, instead of routing the bind(x) request across the network, root naming context smart proxy 708 makes the necessary DCE/CDS operations locally within client process 700 to add object x to the DCE/CDS name space within DCE/CDS 706 (step 808) with the process terminating thereafter.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include: recordable-type media such a floppy discs and CD-ROMs and transmission-type media such as digital and analog communications links.

The description of the preferred embodiment of the present invention has been presented for purposes of illustration and description, but is not limited to be exhaustive or limited to the invention in the form disclosed. Many modifications and variations will be apparent to those of ordinary skill in the art. That the embodiment was chosen and described in order to best explain the principles of the invention the practical application to enable others of ordinary skill in the art to understand the invention for various embodiments with various modifications as are suited to the particular use contemplated.

What is claimed is:

1. A method in an object oriented environment in a distributed data processing system for handling messages, the method comprising:

detecting a message from a client application in a client process to a target object located on a remote system, wherein the message employs an object reference for the target object;

determining whether data within the target object requested by the message can be obtained within the client process; and processing the message within the client process in response to determining that the requested data can be obtained within the client process by:

creating a smart proxy in response to the object being located on a remote data processing system;

creating a local object within the client process using the smart proxy; and routing messages for the target object to the local object.

2. The method of claim 1 further comprising:

sending the message to the remote system in response to determining that the client process is unable to obtain the requested data.

3. A distributed data processing system for handling messages, wherein the distributed data processing system includes an object oriented environment, the distributed data processing system comprising:

detecting means for detecting a message from a client application in a client process relating to a target object located on a remote system, wherein the message employs an object reference for the target object;

determination means for determining whether data within the target object requested by the message can be obtained within the client process; and processing means for processing the message within the client process in response to determining that the requested data can be obtained within the client process by:

creating a smart proxy in response to the object being located on a remote data processing system;

creating a local object within the client process using the smart proxy; and routing messages for the target object to the local object.

4. The distributed data processing system of claim 3 further comprising:

sending means for sending the message to the remote system in response to determining that the client process is unable to obtain the requested data.

5. The distributed data processing system claim 3, wherein the smart proxy locates a factory object and invokes a method on the factory object to create the local object.

* * * * *